(12) United States Patent
Venkatesh (10) Patent No.: US 9,323,483 B2
(45) Date of Patent: Apr. 26, 2016

(54) LOCATION-BASED PRINT NOTIFICATIONS

(75) Inventor: Ranjeetha Venkatesh, Bangalore Karnataka (IN)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 402 days.

(21) Appl. No.: 13/284,213

(22) Filed: Oct. 28, 2011

(65) Prior Publication Data

US 2013/0107312 A1    May 2, 2013

(51) Int. Cl.
*G06F 3/12* (2006.01)
*H04L 29/08* (2006.01)

(52) U.S. Cl.
CPC ............ *G06F 3/1207* (2013.01); *G06F 3/1238* (2013.01); *G06F 3/1259* (2013.01); *G06F 3/1267* (2013.01); *G06F 3/1288* (2013.01); *G06F 3/1292* (2013.01); *H04L 67/18* (2013.01)

(58) Field of Classification Search
None
See application file for complete search history.

(56) References Cited

U.S. PATENT DOCUMENTS

| | | |
|---|---|---|
| 6,678,750 B2 | 1/2004 | Meade, II et al. |
| 6,751,732 B2 | 6/2004 | Strobel et al. |
| 6,922,725 B2 | 7/2005 | Lamming et al. |
| 6,952,645 B1 | 10/2005 | Jones |
| 7,187,462 B2 | 3/2007 | Oakeson et al. |
| 7,221,909 B2 | 5/2007 | Kiyose |
| 7,400,425 B2 | 7/2008 | Parry |
| 7,460,265 B2 | 12/2008 | Keeney et al. |
| 7,512,713 B2 | 3/2009 | Wang et al. |
| 7,756,530 B2 | 7/2010 | Taniguchi et al. |
| 7,831,216 B1 | 11/2010 | Yenney et al. |
| 8,001,404 B2 | 8/2011 | Pathak |
| 8,319,999 B2 | 11/2012 | Hanaoka et al. |
| 8,339,639 B2 | 12/2012 | St. Jacques, Jr. et al. |
| 8,346,903 B2 | 1/2013 | Shepherd |
| 8,369,837 B2 | 2/2013 | Huang et al. |
| 8,386,677 B2 | 2/2013 | Lydon et al. |
| 8,482,781 B2 | 7/2013 | Steele et al. |
| 2002/0013869 A1* | 1/2002 | Taniguchi et al. ............. 710/33 |
| 2002/0191210 A1 | 12/2002 | Staas et al. |
| 2003/0038965 A1 | 2/2003 | Simpson et al. |
| 2003/0076526 A1 | 4/2003 | Gopalan |
| 2003/0115458 A1* | 6/2003 | Song ............................ 713/165 |
| 2004/0125401 A1 | 7/2004 | Earl et al. |
| 2004/0137928 A1 | 7/2004 | Biundo |
| 2005/0036663 A1 | 2/2005 | Caspi et al. |
| 2005/0174609 A1 | 8/2005 | Thurlow |
| 2006/0044598 A1 | 3/2006 | Etelapera |

(Continued)

FOREIGN PATENT DOCUMENTS

EP    1691270        8/2006
WO    WO-2005069556 A1    7/2005

OTHER PUBLICATIONS

Hewlett-Packard Development Company, L.P., "Solution and Feature Guide," HP Universal Print Driver, 2009, <http://h20331.www2.hp.com/Hpsub/downloads/UPD5_guide_final,%20web.pdf>.

(Continued)

*Primary Examiner* — Ming Hon
(74) *Attorney, Agent, or Firm* — HP Inc. Patent Department (57) ABSTRACT

In one implementation, a print service system communicates with a device to provide notifications related to a print job at the device based on the proximity of the device to the printer. Additionally, the print service system communicates with the printer to provide a print job to the printer.

14 Claims, 7 Drawing Sheets

(56) References Cited

U.S. PATENT DOCUMENTS

| | | | |
|---|---|---|---|
| 2006/0252409 A1 | 11/2006 | Brenchley et al. | |
| 2007/0124436 A1 | 5/2007 | Shepherd | |
| 2007/0127063 A1 | 6/2007 | Fertlitsch et al. | |
| 2008/0096517 A1* | 4/2008 | Appleyard | H04W 4/16 455/403 |
| 2008/0158597 A1 | 7/2008 | Hashimoto et al. | |
| 2008/0239392 A1* | 10/2008 | Nanaumi | 358/1.15 |
| 2009/0063518 A1 | 3/2009 | Jung et al. | |
| 2009/0296125 A1* | 12/2009 | Kai | 358/1.9 |
| 2009/0319835 A1 | 12/2009 | Teranishi | |
| 2010/0020349 A1 | 1/2010 | Carroll | |
| 2010/0073707 A1 | 3/2010 | Ferlitsch | |
| 2010/0188698 A1 | 7/2010 | Koizumi | |
| 2010/0277753 A1* | 11/2010 | Shinchi | 358/1.9 |
| 2010/0290073 A1* | 11/2010 | Nuggehalli et al. | 358/1.14 |
| 2010/0309510 A1* | 12/2010 | Hansen | 358/1.15 |
| 2010/0332562 A1 | 12/2010 | Emigh et al. | |
| 2011/0310428 A1 | 12/2011 | Ciriza et al. | |
| 2012/0069386 A1* | 3/2012 | St. Laurent et al. | 358/1.15 |
| 2012/0069771 A1 | 3/2012 | Tandon et al. | |
| 2012/0094694 A1 | 4/2012 | Malkin et al. | |
| 2012/0140285 A1 | 6/2012 | Kamath et al. | |
| 2012/0218600 A1 | 8/2012 | Shaw et al. | |
| 2012/0250073 A1 | 10/2012 | Juchem et al. | |
| 2012/0262753 A1* | 10/2012 | Viccari et al. | 358/1.15 |
| 2012/0300251 A1 | 11/2012 | St. Laurent et al. | |
| 2012/0307298 A1 | 12/2012 | Ishige et al. | |
| 2012/0311585 A1 | 12/2012 | Gruber et al. | |
| 2013/0003126 A1 | 1/2013 | Van Osdol et al. | |
| 2013/0027718 A1 | 1/2013 | Fujii | |
| 2013/0083339 A1 | 4/2013 | Ebner et al. | |
| 2013/0107312 A1 | 5/2013 | Venkatesh | |
| 2013/0322401 A1 | 12/2013 | Visuri et al. | |
| 2014/0032728 A1 | 1/2014 | O'Neil et al. | |
| 2014/0085663 A1 | 3/2014 | Kavanappillil et al. | |
| 2014/0240756 A1 | 8/2014 | Ganesan et al. | |

OTHER PUBLICATIONS

USPTO, Final Office Action issued in U.S. Appl. No. 13/076,025, Dec. 30, 2013.
USPTO, Non-final Office Action issued in U.S. Appl. No. 13/076,025, Sep. 13, 2013.
USPTO, Final Office Action issued in U.S. Appl. No. 13/076,025, Mar. 15, 2013.
USPTO, Non-final Office Action issued in U.S. Appl. No. 13/076,025, Oct. 30, 2012.
Alan Kasameyer, "The Top 6 Printing Rules for Saving Your Company Money," Nov. 7, 2011, <http://www.sepialine.com/2013/11/07/top-6-printing-rules-saving-company-money/>.
Dell Inc., "Dell Proximity Printing Solution," 2010, <http://www.dell.com/downloads/global/solutions/Dell_Proximity_Print_us.pdf?c=us&I=en&s=gen>.
Gupta et al., "Adding GPS-Control to Traditional Thermostats: An Exploration of Potential Energy Savings and Design Challenges," Pervasive Computing. Springer Berlin Heidelberg, 2009, pp. 95-114, <http://web.media.mit.edu/~intille/papers-files/GuptaIntilleLarson09.pdf>.
Konica Minolta, "Pagescope Enterprise Suite 3," Oct. 2013, <http://kmbs.konicaminolta.us/wps/wcm/connect/35d0aaeb-60f8-44f2-9522-32df2184c8b5/PageScope_Brochure_Enterprise_Suite_Brochure.pdf?MOD=AJPERES&CACHEID=35d0aaeb-60f8-44f2-9522-32df2184c8b5>.
Konica Minolta, "Rule-Based Printing," Jan. 2014, <http://www.konicaminolta.eu/fileadmin/content/eu/Business_Solutions/Products/Applications/Images/Output_Management/PageScope_MyPrint_Manager_RBP_Option_Datasheet.pdf>.
Koo, S.G.M. et al., Location Discovery in Enterprise-based Wireless Networks: Case Studies and Applications, (Research Paper), May 8, 2002.
Nest Community, "Use phone's location to trigger away mode," (post and comments), Jan. 29, 2013—May 8, 2014, <https://community.nest.com/ideas/1033#>.
Nest Labs, "What is Auto-Away?," Nest Support, (web page), May 16, 2014, <http://support.nest.com/article/VVhat-is-Auto-Away>.
Ringdale, "FollowMe Printing," (web page), May 16, 2014, <http://www.followme.ringdale.com/applications/followme_printing/>.
Skylark, "Frequently Asked Questions," May 16, 2014, <http://www.skylarkios.com/faq/>.
Skylark, "Skylark for Nest Learning Thermostat," May 16, 2014, <http://www.skylarkios.com/>.
Vision PLC, "uniFLOW—one platform for all your print, scan and device management," available Apr. 29, 2014, <http://www.visionplc.co.uk/partners/uniflow-one-platform-for-all-your-print-scan-and-device-management>.
Wikipedia, "Location-based service," May 7, 2014, <http://en.wikipedia.org/wiki/Location-based_service>.
Wikipedia, "Mobile phone tracking," May 16, 2014, <http://en.wikipedia.org/wiki/GSM_localization>.
Printeron, "PrinterOn Enterprise, Secure mobile printing from any device, to any printer, on any network," Enterprise Printing Solutions, (Research Paper), Jun. 15, 2012, found at http://www.printeron.com/images/docs/PrinterOnEnterprisePrintingSclutions.pdf, Jun. 15, 2012.
Tomshardware.com, "How to Wakeup a Sleeping Network Printer," (Web Page), Tom's Hardware > Forum > Computer Peripherals > Printers > How to wakeup a sleeping network printer, 2000-2009, 3 pages, available at: <tomshardware,com/forum/62523-3-wakeup-sleeping-network-printer>.
International Searching Authority, International Search Report and Written Opinion, issued in PCT Application No. PCT/US2015/012034, Mar. 30, 2015, 12 pages.
Tricerat, "Proximity Printing," Sep. 28, 2013, <http://web.archive.org/web/20130928094836/http://www.tricerat.com/resources/topics-library/proximity-printing>.
Hewlett-Packard Development Company, L.P., "Cloud printing in the enterprise: Liberating the mobile print experience from cables, operating systems and physical boundaries," Mar. 2010, <http://www.hubtechnical.com/Collateral/Documents/English-US/HP/11-CloudPrintingintheEnterprise.pdf>.
Hewlett-Packard Development Company, L.P., "HP Access Control Secure Pull Printing," Nov. 2008, <http://h71028.www7.hp.com/enterprise/downloads/HP-Access-Control-Secure-Pull-Printing.pdf>.
Hewlett-Packard Development Company, L.P., "HP ePrint Enterprise mobile printing solution," Mar. 2010, <http://www.hp.com/hpinfo/newsroom/press_kits/2010/MPSSpring2010/pdf/HP_ePrint.pdf>.
Hewlett-Packard Development Company, L.P., "HP ePrint Enterprise mobile printing solution," Sep. 2010, <http://www.hp.com/hpinfo/newsroom/press_kits/2010/InnovationSummit/HP_ePrint_Enterprise_Solution.pdf>.
JR Raphael, "How free Google services can help shrink your phone bill," Oct. 11, 2012, Computerworld.com, <http://www.computerworld.com/article/2473314/mobile-wireless/how-free-google-services-can-help-shrink-your-phone-bill.html>.

* cited by examiner

LOCATION-BASED PRINT NOTIFICATIONS

BACKGROUND

Printer users release print jobs and manage printers locally at printers. For example, a user can provide a print job to a printer, and then enter a unique identifier to release the print job at a user interface of the printer such as a printer panel. Because the user interfaces of printers can vary significantly, users can become frustrated while navigating a user interface to enter a unique identifier to release a print job. Moreover, the user is often unaware of the status of the print job (e.g., whether the print job is ready for printing at the printer) before the user approaches the printer.

Additionally, a user with an administrator role for a printer can alter settings of the printer and verify levels of consumables at a user interface of a printer. Some printers provide notifications related to levels of consumables or operation state of a printer to such a user via, for example, electronic mail messages. Such notifications can be undesirable, for example, when such a user is not in close physical proximity to such printers and, therefore, unable to address or appropriately respond to the notifications. Moreover, the logic and computing resources necessary to provide such notifications from a printer can increase the cost of such printers.

DETAILED DESCRIPTION

Implementations discussed herein include a print service system to provide notifications to a device based on the proximity of the device to a printer. For example, the print service system can compare location information provided by the device with location information for a printer to which a user of the device has provided a print job. If the device is within a particular proximity of the printer, the print service system provides a notification to the device (or to the user of the device) including a mechanism (e.g., a control such as a hyperlink) to release the print job at the printer. Accordingly, the user of the mobile device need not navigate a user interface of the printer to release the print job.

As another example, the print service system can receive information from a group of printers related to levels of consumables or operation state of those printers. Additionally, the print service system can compare location information provided by a device with location information for each of the printers to determine whether the device is within a particular proximity from any of the printers. If the device is within such a proximity, the print service system determines whether a user of the device has an administrator role with respect to any of those printers, and provides information related to levels of consumables or operation state of those printers for which the user has an administrator role. Accordingly, the user can receive notifications related to levels of consumables or operation state of printers managed by the user when the user is near those printers.

Figure 1:
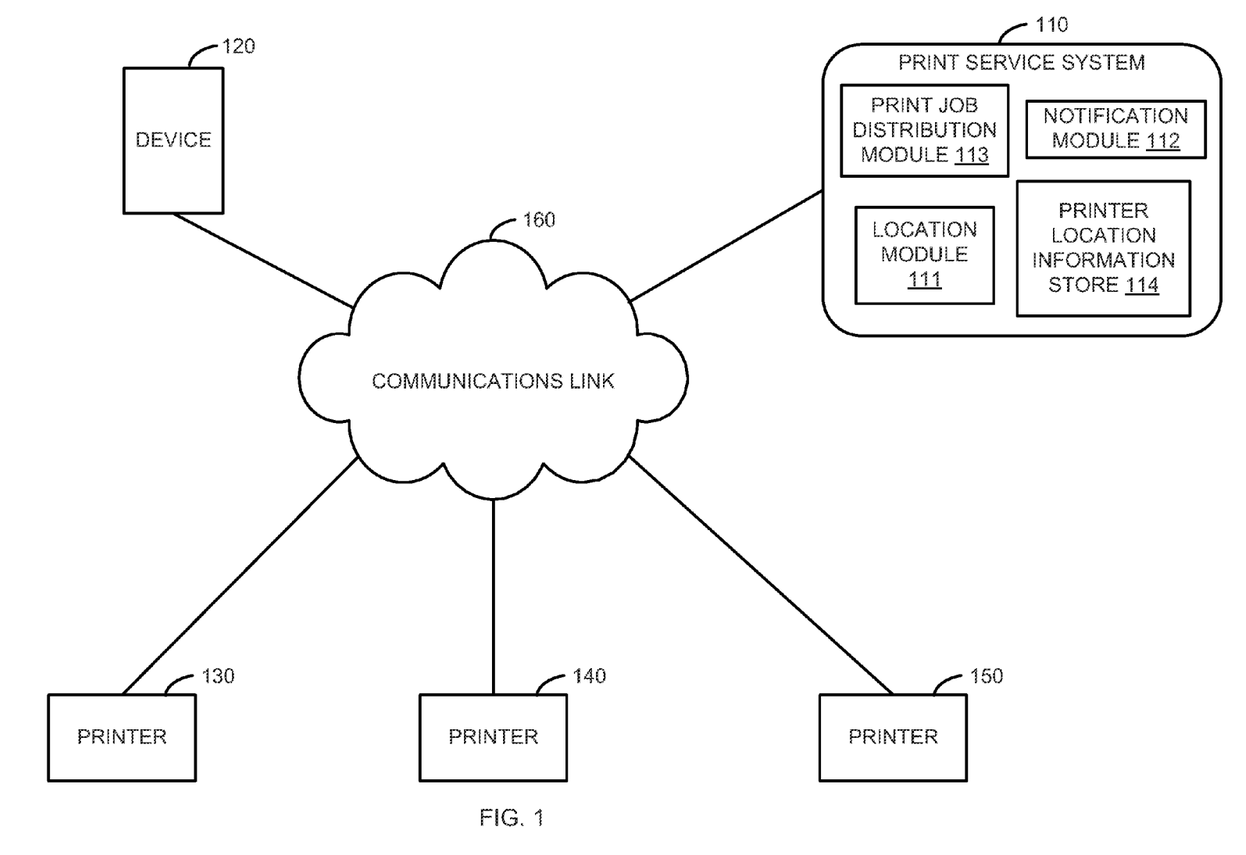
FIG. 1 is an illustration of an environment including a print service system, according to an implementation.

FIG. 1 is an illustration of an environment including a print service system, according to an implementation. Although various modules (i.e., combinations of hardware and software) are illustrated and discussed in relation to FIGS. 1-3 and other example implementations, other combinations or sub-combinations of modules can be included within other implementations. Said differently, although the modules illustrated in FIGS. 1-3 and discussed in other example implementations perform specific functionalities in the examples discussed herein, these and other functionalities can be accomplished at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules.

The environment illustrated in FIG. 1 includes print service system 110, device 120, printers 130, 140 and 150, and communications link 160. Communications link 160 includes devices, services, or a combination thereof that define communications paths between print service system 110, device 120, and printers 130, 140 and 150, and/or other devices or services. For example, communications link 160 can include one or more of a cable (e.g., twisted-pair cable, coaxial cable, or fiber optic cable), a wireless link (e.g., radio frequency link, optical link, or sonic link), or any other connectors or systems that transmit or support transmission of signals. Communications link 160 can include communications networks such as an intranet, the Internet, other telecommunications networks, or a combination thereof. Additionally, communications link 160 can include proxies, routers, switches, gateways, bridges, load balancers, and similar communications devices. Furthermore, the connections and communications paths illustrated in FIG. 1 are logical and do not necessarily reflect physical connections.

Printers 130, 140 and 150 are configured to communicate via communications link 160. For example, printers 130, 140 and 150 can each include a communications interface such as a network interface card (e.g., an IEEE 802.11-compliant network interface card or a wired network interface card) via which printers 130, 140 and 150 can communicate with print service system 110. In some implementations, one or more of printers 130, 140 and 150 can communicate via a computing device operatively coupled to communications link 160. For example, a printer can be connected to a computing device (not shown) via a Universal Serial Bus (USB) connection, and that computing device can communicate via communications link 160. In such implementations, the computing device can function as a proxy to the communications link for the printer.

Additionally, printers 130, 140 and 150 are configured to receive print jobs from print service system 110 and release (or print) such print jobs in response to a release instruction. A release instruction is a signal or command that instructs a printer to release a print job. For example, print service system 110 can send a release instruction to printer 130 that identifies a print job stored at printer 130, and printer 130 prints the print job. As another example, a user can enter a unique identifier (such as personal identification number (PIN)) associated with a print job at a user interface of printer 130, and a release instruction can be generated at the printer in response to input of the unique identifier.

Device 120 is a mobile computing device such as a smartphone, a tablet, a notebook computer, or personal digital assistant than is mobile in nature. That is, a user of device 120 can readily move device 120 from one location to another and use device 120 while moving between locations.

Print service system 110 facilitates providing print jobs to printers 130, 140 and 150, and provides notifications related to print jobs and/or printers. For example, a user (or client) of print service system 110 can provide a print request to print service system 110 via device 120 or another computing device. Print service system 110 then provides a print job to a printer (e.g., one of printers 130, 140 and 150) based on the print request, and provides a notification to device 120 when device 120 is within a particular proximity of the printer.

A print request is data that requests some action from print service system 110. For example, a print request can identify content to be printed and a printer at which the content should be printed. As another example, a print request can identify a print job and indicate that that print job should be released. A print job is data that includes or identifies content to be printed. For example, a print job can include PostScript (PS) or Portable Document Format (PDF) data representing content to be printed at a printer. In other implementations, a print job can include data representing content to be printed that is formatted in other public or proprietary formats. Moreover, in some implementations, a print job can also include instructions related to content to be printed. For example, a print job can include instructions to prevent a printer from printing (or releasing) a print job until a release instruction related to the print job is received at the printer. As another example, a print job can include a unique identifier of the print job.

More specifically, print service system 110 receives print requests via a variety of methodologies. For example, print service system 110 can receive print requests via Short Message Service (SMS), electronic mail, a messaging protocol such as the Extensible Messaging and Presence Protocol (XMPP), the Hypertext Transport Protocol (HTTP), or other methodologies. As a specific example, the ePrint™ print service provided by Hewlett-Packard Company is an example of a print service system that receives print requests via electronic mail messages.

After receive a print request that identifies or includes content to be printed, print service system 110 generates a print job related to the print request. For example, print service system 110 can format or modify data included in a print request to generate a related print job. As another example, print service system 110 can access content identified, but not included, in a print request. For example, print service system 110 can access an image file identified by a Uniform Resource Identifier (URI) or Uniform Resource Locator (URL) in the print request, and can include the image file in the print job.

Print job distribution module 113 then provides the print job to a printer. For example, print job distribution module 113 can provide the print job to a printer identified in the print request using a messaging protocol such as XMPP. As another example, print job distribution module 113 can provide the print job to a printer from a group of printers identified in the print request that includes functionalities or capabilities (e.g., collating, two-sided printing, or color printing) identified in the print request or that are necessary to print content identified in the print request. As another example, print job distribution module 113 can provide the print job to a printer associated with an account of print service system 110 identified in the print request. The account can be identified explicitly in the print request (e.g., the print request includes an identifier of the account), or implicitly in the print request (e.g., the print request was received at an electronic mail address or from an SMS subscriber number associated with the account). As yet another example, print job distribution module 113 can provide the print job to a printer with a capability identified in or beneficial to the print request from a group of printers associated with an account of print service system 110 identified in the print request.

Location module 111 receives location information from device 120, and compares that location information with location information associated with (e.g., representing the location of) the printer to which print job distribution module 113 provided the print job. Location information can include latitude/longitude coordinates, identifiers of reference points or locations, or other information that describes a location. Location module 111 can access location information associated with the printer at printer location information store 114, or can access the location information at (e.g., request from) the printer via communications link 160. Location information store 114 is a database or other repository of location information for printers. For example, a user of print service system 110 can upload latitude/longitude coordinates of printers that should be associated with an account of that user at print service system 110.

To compare location information from device 120 to location information for the printer, location module 111 applies a proximity rule to the location information from device 120 and the location information for the printer. Said differently, location module 111 determines whether the location information from device 120 and the location information for the printer satisfy a proximity rule. The proximity rule defines a condition between locations. For example, the proximity rule defines a condition based on the proximity of two locations. If the two locations are within that proximity, the condition (and, therefore, the proximity rule) is satisfied. As specific examples, the proximity rule can define a condition of 100 meters, 30 meters, 10 meters, or some other condition specified, for example, in a print request or an account of print service system 110. If the location information from device 120 and the location information for the printer indicate that the location of device 120 and the location of the printer are within the proximity defined by the proximity rule, the proximity rule is satisfied.

Notification module 112 provides notifications to device 120 after a proximity rule is satisfied by the location of device 120 and the location of one or more printers. For example, location module 111 can provide a signal to notification module 112 to indicate that a proximity rule is satisfied, and notification module 112 can provide a notification to device 120 in response to the signal. The notification can be provided to device 120 via communications link 160 using a variety of methodologies. For example, notification module 112 can provide the notification via SMS, electronic mail, a messaging protocol such as XMPP, or some other methodology.

The notification includes information related to a printer and/or print job. For example, the notification can include a list of print jobs available to be released (e.g., printed) at the printer by the user. Additionally, the notification can include a control such as a hyperlink that a user of device 120 can select to release the print job. As a specific example, the notification can include a hyperlink that, when activate, provides a unique identifier associated with a print job to an HTTP interface of print service system 110. After print service system 110 receives the unique identifier, print service system 110 provides a release instruction to the printer and the print job is released (or printed). In some implementations, the notification includes the unique identifier in a format that is readable to the user of device 120. The user can then enter the unique identifier at a user interface of the printer to release the print job.

In some implementations, a control is included in the notification as an instruction for a user interface of device 120 to display or generate the control. For example, a notification can include instructions such as HTML, JavaScript™, JavaS™, or other codes in response to which a user interface of device 120 displays a control with an appearance, functionalities, or other attributes described or defined by the instructions. Said differently, a control included in the notification can be realized at a user interface of device 120.

Figure 2:
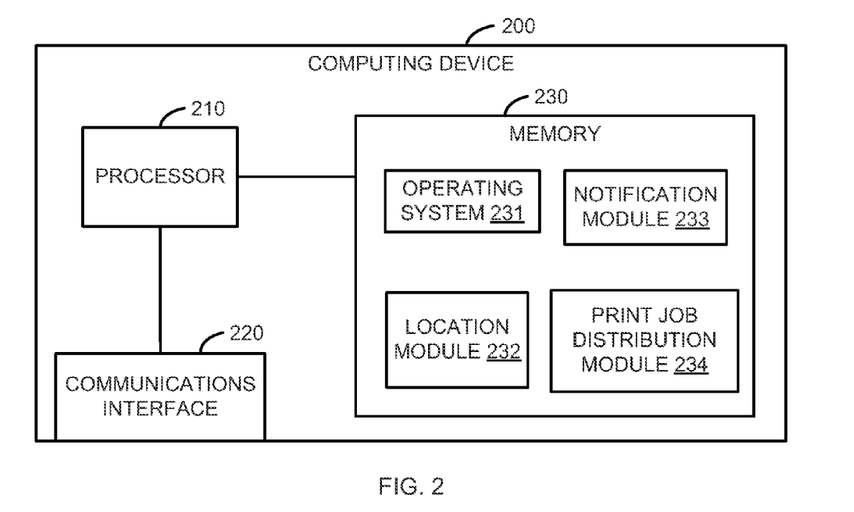
FIG. 2 is a schematic block diagram of a computing device hosting a print service system, according to an implementation.
Figure 3:
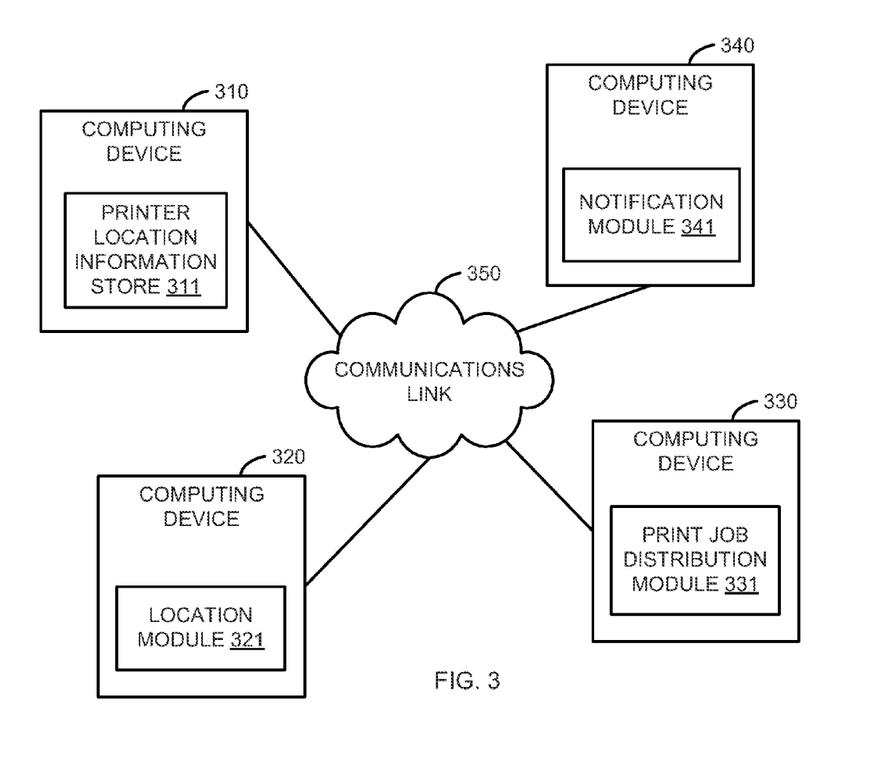
FIG. 3 is a schematic block diagram of a group of computing devices hosting a print service system, according to an implementation.

Print service system 110 can be implemented using a variety of topologies or architectures. FIGS. 2 and 3 illustrate two example implementations. FIG. 2 is a schematic block diagram of a computing device hosting a print service system, according to an implementation. Computing device 200 includes processor 210, communications interface 220, and memory 230. Processor 210 is any combination of hardware and software that executes or interprets instructions, codes, or signals. For example, processor 210 can be a microprocessor, an application-specific integrated circuit (ASIC), a distributed processor such as a duster or network of processors or computing devices, a multi-core or multi-processor processor, or a virtual machine.

Communications interface 220 is a module via which processor 210 can communicate with other processors or computing devices (e.g., device 120 or printers 130, 140 and 15 illustrated in FIG. 1) via communications link. For example, communications interface 220 can include a network interface card and a communications protocol stack hosted at processor 210 (e.g., instructions or code stored at memory 230 and executed or interpreted at processor 210 to implement a network protocol). As specific examples, communications interface 220 can be a wired interface, a wireless interface, an Ethernet interface, a Fiber Channel interface, an InfiniBand interface, an IEEE 802.11 interface, or some other communications interface via which processor 210 can exchange signals or symbols representing data to communicate with other processors or computing devices.

Memory 230 is a processor-readable medium that stores instructions, codes, data, or other information. As used herein, a processor-readable medium is any medium that stores instructions, codes, data, or other information non-transitorily and is directly or indirectly accessible to a processor. Said differently, a processor-readable medium is a non-transitory medium at which a processor can access instructions, codes, data, or other information. For example, memory 230 can be a volatile random access memory (RAM), a persistent data store such as a hard disk drive or a solid-state drive, a compact disc (CD), a digital video disc (DVD), a Secure Digital™ (SD) card, a MultiMediaCard (MMC) card, a CompactFlash™ (CF) card, or a combination thereof or other memories. In some implementations, memory 230 can be integrated with processor 210, separate from processor 210, or external to computing device 200.

Memory 230 includes instructions or codes that when executed at processor 210 implement operating system 231, location module 232, notification module 233, and print job distribution module 234. Location module 232, notification module 233, and print job distribution module 234 collectively implement a print service system. In other words, operating system 231, location module 232, notification module 233, and print job distribution module 234 are each instructions or code that—when executed at processor 210—cause processor 210 to perform operations that implement an operating system and a print service system. Said differently, operating system 231, location module 232, notification module 233, and print job distribution module 234 are hosted at computing device 200 (or at processor 210). In some implementations, a printer location information store and/or other module or modules of a print service system are also hosted at computing device 200.

In some implementations, computing device 200 can be a virtualized computing device. For example, computing device 200 can be hosted as a virtual machine at a computing server. Moreover, in some implementations, computing device 200 can be a virtualized computing appliance, and operating system 231 is a minimal or just-enough operating system to support (e.g., provide services such as a communications protocol stack and access to components of computing device 200 such as communications interface 220) a print service system including location module 232, notification module 233, and print job distribution module 234.

A print service system (e.g., a print service including location module 232, notification module 233, and print job distribution module 234) can be accessed or installed at computing device 200 from a variety of memories or processor-readable media. For example, computing device 200 can access a remote processor-readable medium via communications interface 220 and the print service system at that processor-readable medium. As a specific example, computing device 200 can be a thin client that accesses operating system 231 and the print service system during a boot sequence.

As another example, computing device 200 can include (not illustrated in FIG. 2) a processor-readable medium access device (e.g., CD, DVD, SD, MMC, or a CF drive or reader) and the print service system at a processor-readable medium via that processor-readable medium access device. As a more specific example, the processor-readable medium access device can be a DVD drive at which a DVD including an installation package for the print service system is accessible. The installation package can be executed or interpreted at processor 210 to install the print service system at computing device 200 (e.g., at memory 230). Computing device 200 can then host or execute the print service.

In some implementations, a print service system can be accessed at or installed from multiple sources, locations, or resources. For example, some components or modules of the print service system can be installed via a communications link, and other components or modules of the print service can be installed from a DVD.

FIG. 3 is a schematic block diagram of a group of computing devices hosting a print service system, according to an implementation. As illustrated in FIG. 3, various components or modules of a print service system can be hosted at different computing devices in communication one with another via a communications link. In other words, a print service system can be distributed across a group of computing device. Such computing devices can be physical computing devices such as computer servers, logical or virtual computing devices such as virtual machines, or a combination thereof. Such implementations can be referred to as cloud, cloud-based, or cloud-hosted implementations, and can be hosted within, for example, one or more data centers, physical computing devices, virtual computing devices, or a combination thereof.

As illustrated in FIG. 3, computing device 310 hosts printer location information store 311, computing device 320 hosts location module 321, computing device 330 hosts print job distribution module 331, and computing device 340 hosts notification module 341. Printer location information store 311, location module 321, print job distribution module 331, and notification module 341 are each a component of a print service system.

Moreover, components of the print service can be distributed across multiple computing devices. For example, print job distribution module 331 can be hosted at each of computing device 330 and another computing device (not shown). Such implementations can provide enhanced fault tolerance and failover capabilities for a print service system.

Figure 4:
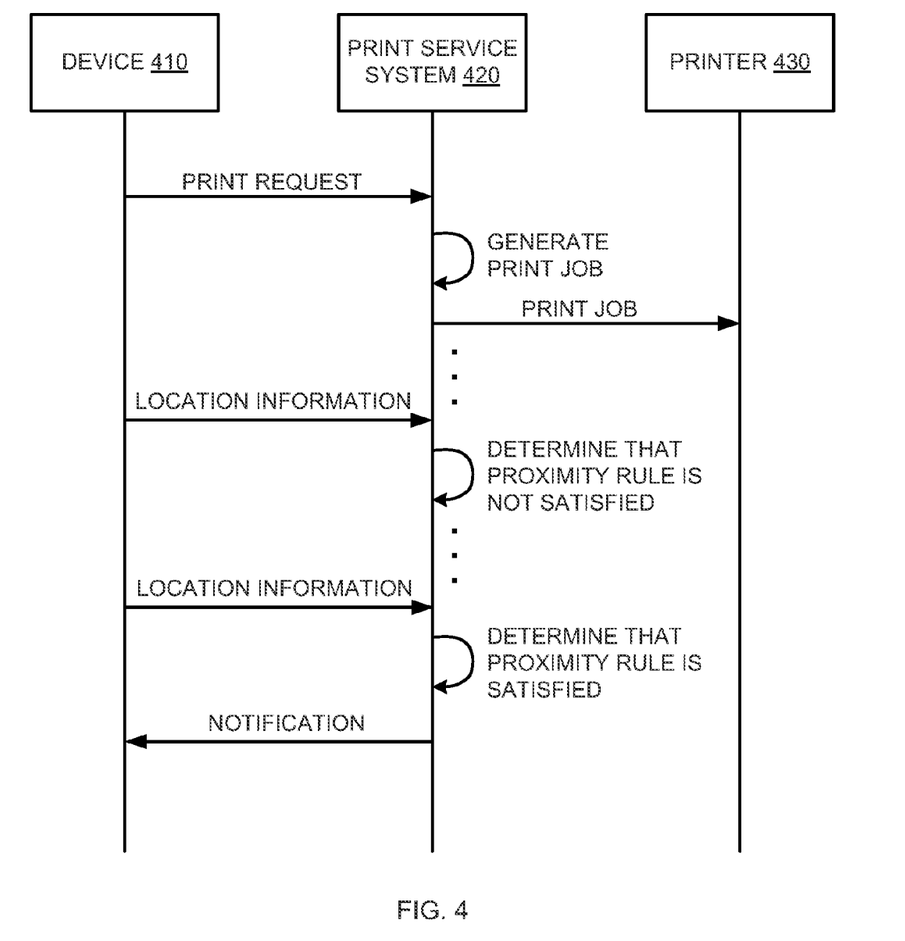
FIG. 4 is an illustration of a data flow within an environment including a print service system, according to an implementation.

FIG. 4 is an illustration of a data flow within an environment including a print service system, according to an implementation. Print service system 420 receives a print request from device 410, and generates a print job based on the print request. Although print service system 420 receives the print request from device 410 in the example illustrated in FIG. 4, another device such as a desktop computer can provide the print request to print service system 420. In some implementations, generating the print job includes generating a unique identifier for the print job. For example, the unique identifier can be a randomly or pseudo-randomly generated sequence of alpha-numeric characters. In some implementations, the unique identifier can include an electronic mail address or account identifier related to an account of print service system 420 for which the print request was received. In other implementations, the unique identifier for the print job can be included in the print request. That is, for example, the unique identifier can be specified by a user of device 410 or by device 410. Print service 420 then provides the print job to printer 430. The print job includes an instruction to not release the print job until a release instruction for the print job is received at printer 430.

Print service system 420 then receives location information from device 410. As illustrated in FIG. 4, device 410 receives location information from device 410 and determines whether a proximity rule for is satisfied by the location information. More specifically, for example, print service system 420 compares the location information from device 410 with location information for printer 430 to determine whether a condition of the proximity rule is satisfied. If the proximity rule is not satisfied, print service 420 can, for example, take no action or provide a status response (not shown) to device 410 to indicate that the proximity rule is not presently satisfied.

If the proximity rule is satisfied, print service system 420 generates a notification related to the print job and provides the notification to device 410. Device 410 can be identified at print service system 420 as the recipient of the notification because device 410 is the source of the location information or based on a preference, setting, or configuration parameter of an account at print service system 420.

In some implementations, print service system 420 can generate a notification based on an event other than a satisfied proximity rule. For example, print service system 420 can include a scheduler (not shown) that generates notifications to be provided to device 410 based on, for example, a time condition. A time condition is a condition that is satisfied at a particular time or group of times. As a specific example, an administrator or a client (e.g., a user of device 410) of print service system 420 can establish a schedule via an interface such as a web-based interface of print service system 420 according to which notifications for outstanding print jobs are provided to device 410. The schedule can include specific time conditions (e.g., time conditions that are satisfied on specific times and/or specific dates), recurring time conditions (e.g., time conditions that are satisfied every weekday, weekly, or monthly), or other time conditions. The scheduler can provide a signal or command to a notification module of print service system 420 to trigger or cause a notification to be provided to device 410 when a time condition is satisfied.

Such a scheduler can operate in addition to a location module of print service system 420 (e.g., each of the location module and the scheduler can provide a signal or command to a notification module of print service system 420 to trigger or cause a notification to be provided to device 410). In some implementations, such a scheduler can operate when print service system 420 does not receive location information from device 410. For example, the scheduler can disregard a satisfied time condition (e.g., not provide a signal or command to a notification module of print service system 420) if location information has been received from device 410 within a predetermined period of time before the time condition, but not disregard (e.g., provide a signal or command to a notification module of print service system 420) if location information has not been received from device 410 within a predetermined period of time before the time condition. Thus, print service system 420 can generate and provide notifications based on satisfied conditions and/or according to a schedule.

The notification can include any of a variety of information related to a print job or printer. For example, print service system 420 can include a unique identifier of the print job to device 410. The unique identifier can then be used to release the print job. For example, a user of device 410 can input the unique identifier at a user interface of printer 430 to generate a release instruction for the print job. Alternatively, for example, a user of device 120 can provide the unique identifier to print service 420 in another print request to print service system 420 (e.g., an HTTP POST message to an HTTP interface of print service system 420) via device 120 by activating for selecting) a hyperlink included in the notification. Print service system 420 can then provide a release instruction to printer 430. In other implementations, the notification can include a control (or instructions that define a control) when displayed at device 410 that a user of device 410 can manipulate to send a print request to print service system 420 to request that the print job be released. Print service system 420 can then similarly provide a release instruction to printer 430.

Figure 5:
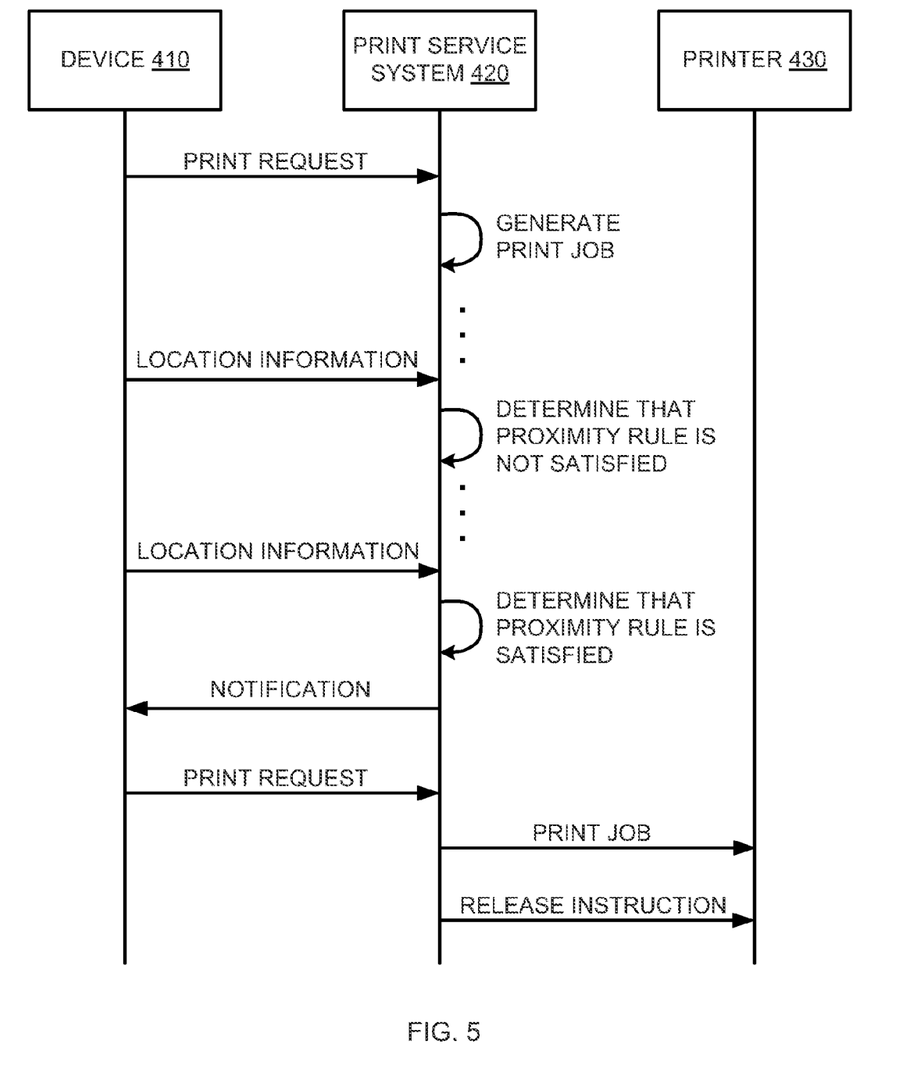
FIG. 5 is an illustration of another data flow within an environment including a print service system, according to an implementation.

FIG. 5 is an illustration of another data flow within an environment including a print service system, according to an implementation. The data flow illustrated in FIG. 5 is similar to the data flow illustrated in FIG. 4. However, print service system 420 does not provide the print job to print 430 until a print request is received in response to the notification.

Rather, print service system 420 can compare the location information received from device 410 with location information for a group of printers to determine whether a proximity rule is satisfied. For example, service system 420 can compare the location information received from device 410 with location information for printers identified in an account associated with device 410 to determine whether a proximity rule is satisfied by the location of the device and a location of any of the printers associated with that account. Moreover, print service system 420 can apply other rules to determine whether a notification should be sent to device 410. For example, print service system 420 can apply capability or functionality rules based on the print request or print job, and provide the notification to device 410 if a proximity rule is satisfied by the location of device 410 and the location of a printer that is capable of handing (e.g., printing) the print job. As a specific example, the notification can be provided to device 410 if the proximity rule is satisfied by the location of device 410 and the location of a printer that can print in color for a color print job.

The notification can identify any printers that are within a proximity from device 410 defined by the proximity rule. A user of device 410 can select a printer identified in the notification via, for example, a user interface of device 410. Device 410 generates a print request in response to the notification and user selection of a printer, and provides the print request to print service system 420. Print service system 420 then provides the print job to printer 430. In the example illustrated in FIG. 5, print service system 420 also provides a release instruction to printer 430 to cause printer 430 to release the print job.

In some implementations, the notification includes information or a mechanism to release the print job, and print service system 420 does not provide the release instruction to printer 430 unless device 410 provides another print request to printer service system 420. As discussed above, for example, the notification can include a hyperlink that includes a unique identifier of the print job, and can be activated to provide a print request to print service system 420. Alternatively, the user of device 410 can release the print job using a user interface of printer 430 and information such as a unique identifier of the print job included in the notification.

Figure 6:
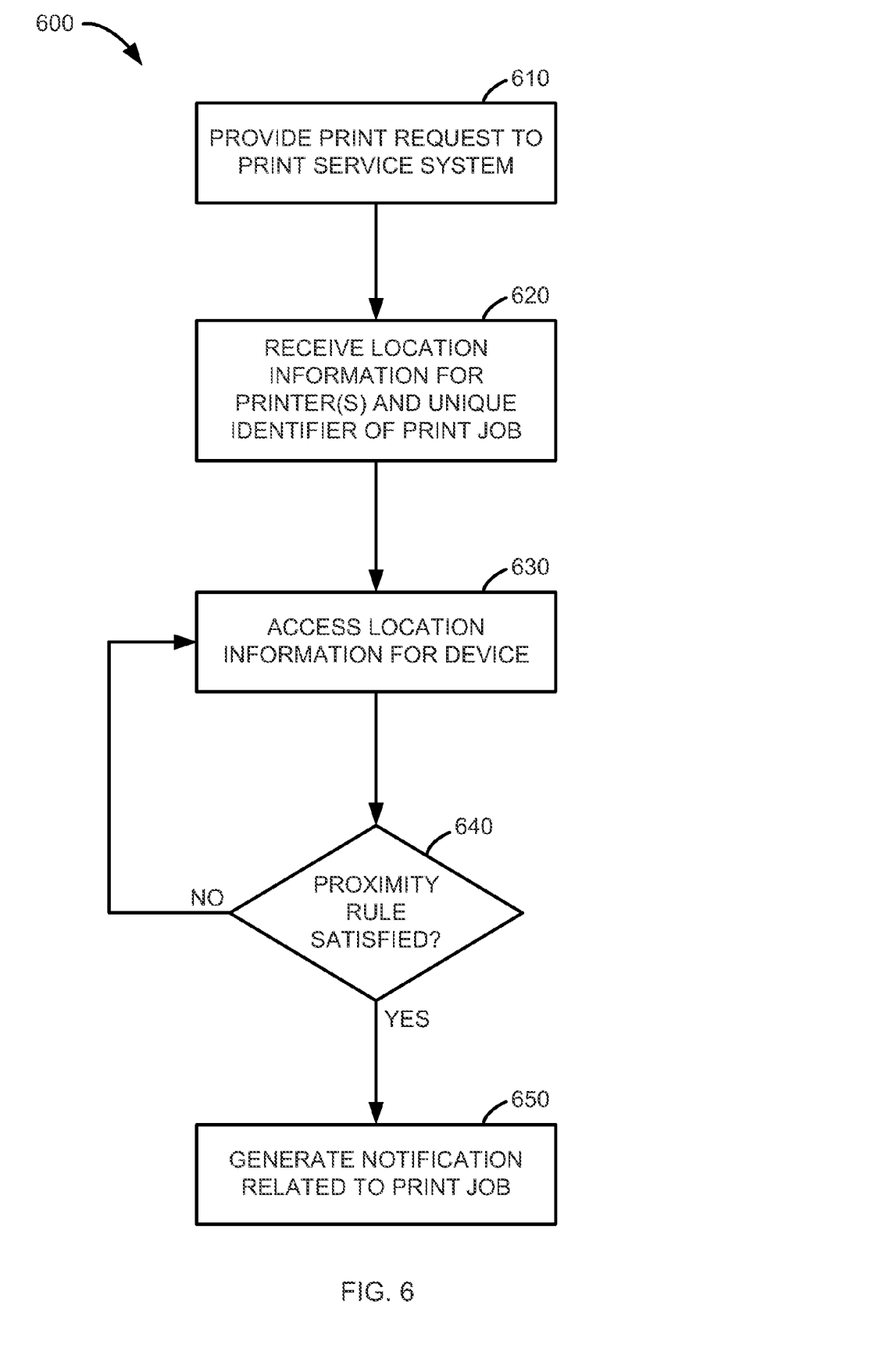
FIG. 6 is a flowchart of a process to generate a notification related to a print request, according to an implementation.

FIG. 6 is a flowchart of a process to generate a notification related to a print request, according to an implementation. Process 600 can be implemented at, for example, a device such as a mobile computing device. In other words, process 600 can be implemented as instructions or codes stored at a memory and executed at a processor of a mobile computing device. As illustrated in FIG. 6, the device implementing process 600 provides a print request to a print service system at block 610. For example, the device can provide the print request in response to user input at a user interface of the device.

The device then receives location information for a printer (or group of printers) at which a print job based on the print request can be released at block 620. For example, the print service system to which the device provided the print request can provide the location information to the device. In some implementations, location information for a printer to which the print job was provided is received at block 620. In other implementations, location information for a group of printers that are capable of printing the print job is received at block 620. Additionally, a unique identifier of the print job is received at block 620. For example, the print service system can generate a print job from the print request and provide location information for printers that can print the print job and a unique identifier of the print job to the device.

The device then accesses location information for the device at block 630, and determines at block 640 whether a proximity rule is satisfied by the location of the device (described by the location information for the device) and the location of any printer (described by the location for the printers) at block 640. For example, location information for the device can be accessed at a Global Positioning System (GPS) module at the device. If the proximity rule is not satisfied at block 640, process 600 returns to block 630 at which location information for the device is again accessed. In some implementations, a delay occurs between blocks 640 and 630. For example, location information for the device can be accessed no more frequently than a frequency such as one access per minute.

If the proximity rule is satisfied at block 640, a notification related to the print job is generated at block 650. For example, a view or window can be displayed at a user interface of the device that includes a description of a printer or printers that can print the print job and mechanisms or controls that can be activated by the user to provide a print request to the print service system to provide the print job to a particular printer and/or to release the print job at a particular printer. Alternatively, for example, a view or window can be displayed at a user interface of the device that includes a description of the printer to which the print job was provided and a control that can be activated by the user to provide a print request to the print service system to release the print job at that printer. Additionally, the notification can include the unique identifier of the print job.

Figure 7:
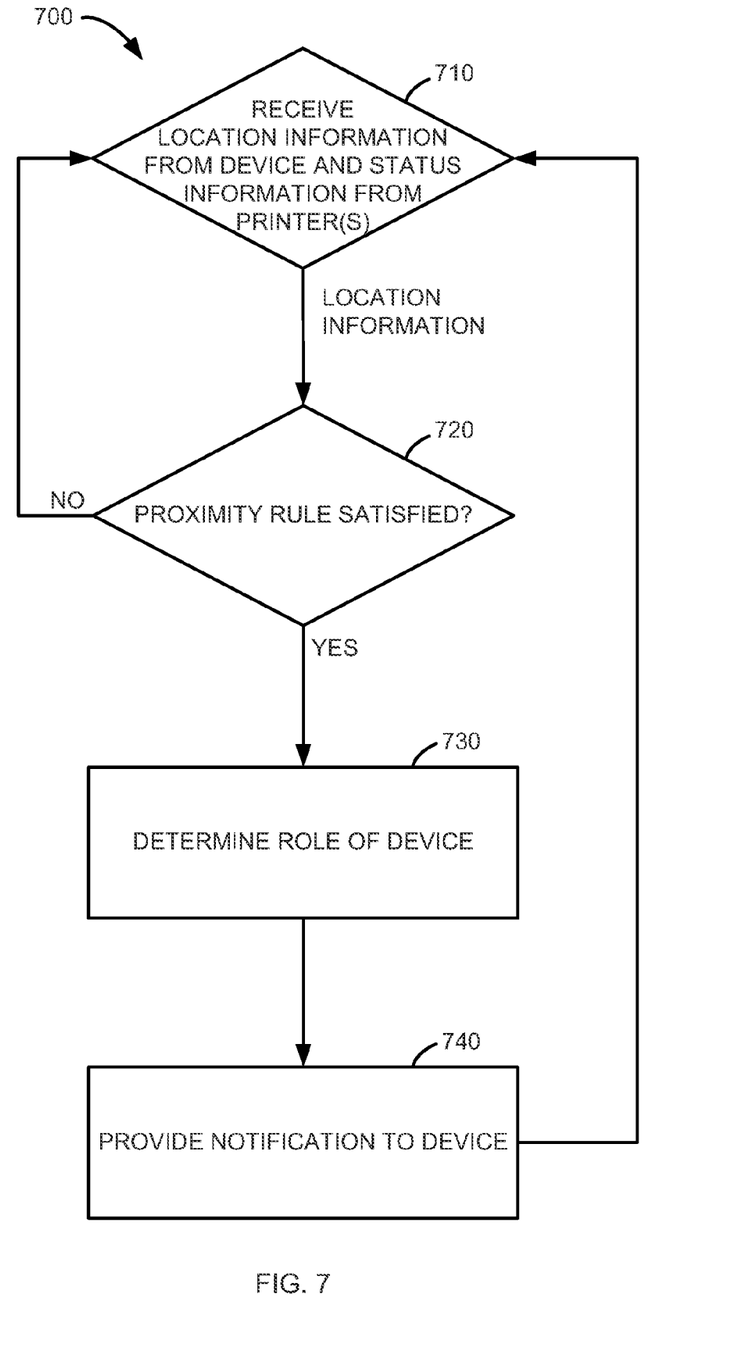
FIG. 7 is a flowchart of a process to provide a notification related to a printer to a device, according to an implementation.

FIG. 7 is a flowchart of a process to provide a notification related to a printer to a device, according to an implementation. Process 700 can be implemented at, for example, a print service system. The print service system implementing process 700 receives location information from a device and status information from a printer or printers at block 710. The status information can include various data related to the status of a printer. For example, the status information can include levels of consumables (e.g., ink, toner, or paper), operation state (e.g., paper jam and print errors), settings, and/or configuration parameters of a printer.

If location information is received from a device, the print service system determines whether a proximity rule is satisfied by the location information for the device and location information for printers from which the state information is received. If the proximity rule is not satisfied at block 720, process 700 returns to block 710 at which location information for the device and status information from the printer or printers can be received.

If the proximity rule is satisfied at block 720, a role of the device from which the location information was received is determined at block 730. Said differently, a role of the user of the device is determined at block 730. Some users can be administrators of the printer or printers from which the status information is received at block 710, and can have various roles related to administration and management of the printer or printers. For example, a user can have an administrator role to monitor the consumables or operation state of a printer. Another user, for example, can have an administrator role to manage or change settings or configuration parameters of a printer.

A print service system implementing process 700 can include accounts that associate devices and roles with users. The roles can define which permissions a user that is an administrator has or holds with respect to one or more printers. For example, the account of a user can include identifiers of printers for which that user is an administrator, identifiers of devices used by the user to provide location information to the print service system, and the roles of the user with respect to the printers for which that user is an administrator. At block 730, the print service system determines the roles of the user associated with device the provided the location information at block 710, and generates a notification based on those roles.

For example, if the role relates to monitoring levels of consumables and operation states of printers, such status information received from one or printers for which the user has that role are included in the notification. As another example, if the role relates to managing or changing settings or configuration parameters of a printer, controls such as hyperlinks to mechanisms for managing or changing such settings or configuration parameters can be included in the notification. As a specific example, the notification can include hyperlinks to an interface of the print service system via which a user can specify or change settings or configuration parameters for a printer, and the print service system can provide the settings or configuration parameters to the printer.

After the notification is generated, the notification is provided to the device at block 740. The user of the device can, for example, address levels of consumables or operation state of a printer in response to the notification. Moreover, if the user has an administrator role to manage or change settings or configuration parameters of one or more printers, that user can activate controls or other mechanisms included in the notification to manage or change such settings or configuration parameters.

Figure 8:
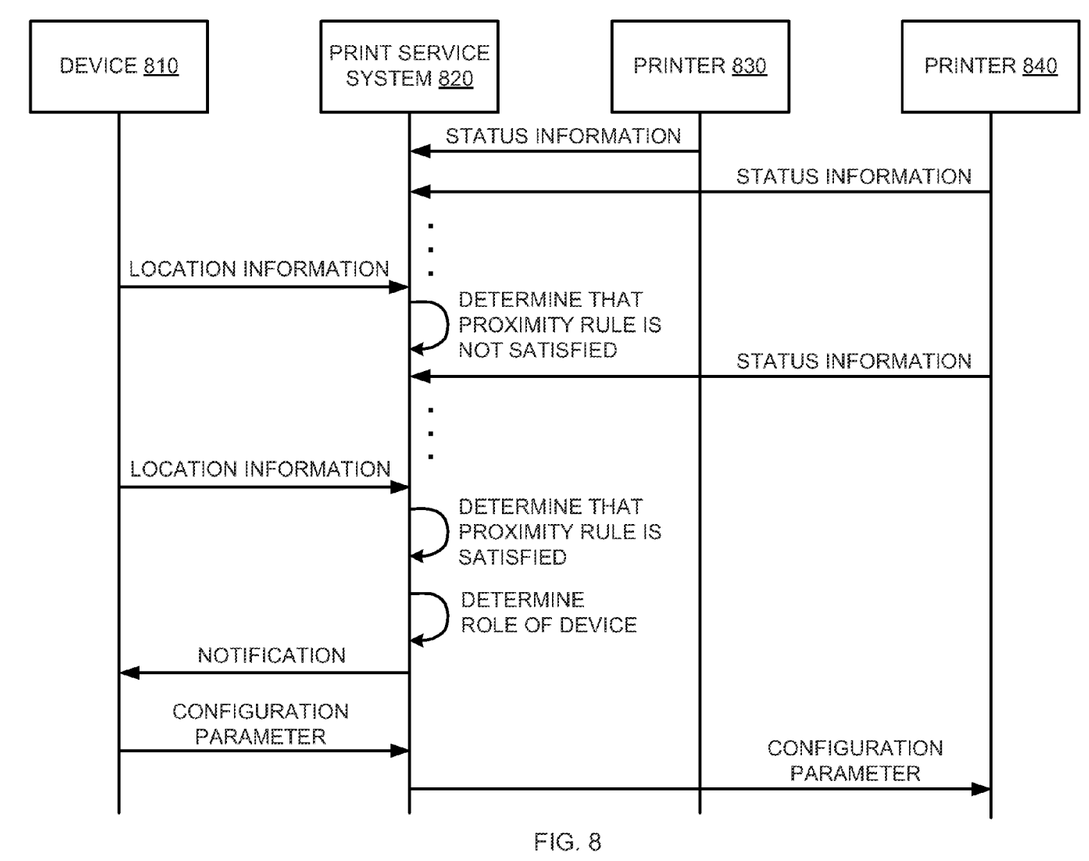
FIG. 8 is an illustration of another data flow within an environment including a print service system, according to an implementation.

FIG. 8 is an illustration of another data flow within an environment including a print service system implementing the process illustrated in FIG. 7, according to an implementation. As illustrated in FIG. 8, print service system 820 receives status information from printers 830 and 840. Additionally, print service system 820 receives location information from device 810, and determines whether the location of device 810 and the location of printers 830 or 840 satisfy a proximity rule. For example, print service system 820 can access location information for printers 830 and 840 at a printer location information store or by communicating with printers 830 and 840 (not shown). The status information and location information can be received at regular intervals, based on events or changed conditions at printers 830 and 840, in response to requests from print service system 820, and/or based on other stimuli.

When print service system 820 determines that a proximity rule is satisfied, print service system 820 determines a role of the device (or a role of the user of the device), and sends a notification based on the status information received from printers 830 and 840 and the role or roles of device 810. That is, as discussed above, print service system 820 includes status information and/or mechanisms to alter printer settings or configuration parameters for printers for which device 810 (or a user of device 810) holds an appropriate or corresponding role.

The notification illustrated in FIG. 8 includes a mechanism to alter a configuration parameters of printer 840. That is, device 810 is associated with an administrator role to manage that configuration parameter of printer 840. Device 810 provides the configuration parameter (or a value for the configuration parameter) via, for example, an interface such as a web interface of print service system 820. Print service system 820 then provides the configuration parameter to printer 840 to alter a configuration or functionality of printer 840.

Because the notifications are provided when device 810 is within a particular proximity of printers 830 and 840, the user of device 810 can be free from the annoyance of receiving frequent notifications related to printers 830 and 840 when the user is cannot adequately respond to such notifications. For example, the user need not receive notifications related to levels of consumables or operation state when the user is remote from a printer and unable at address such issues.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As another example, functionalities discussed above in relation to specific modules or elements can be included at different modules, engines, or elements in other implementations. Additionally, it should be understood that the systems, apparatus, and methods described herein can include various combinations and/or sub-combinations of the components and/or features of the different implementations described. Thus, features described with reference to one or more implementations can be combined with other implementations described herein. Furthermore, implementations illustrated herein with, for example, flowcharts and data flows represent example implementations. The sequence of blocks or communications in such illustrations can vary in other implementations.

As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software includes hardware only (i.e., a hardware element with no software elements), software hosted at hardware (e.g., software that is stored at a memory and executed or interpreted at a processor), or at hardware and software hosted at hardware.

Additionally, as used herein, the singular forms "a," "an," and "the" include plural referents unless the context clearly dictates otherwise. Thus, for example, the term "module" is intended to mean one or more modules or a combination of modules. Furthermore, the term "provide" as used herein includes push mechanism (e.g., sending a notification to a device via a communications path or connection), pull mechanisms (e.g., delivering a notification to a device in response to a request from the device), and store mechanisms (e.g., storing a notification at a data store or resource at which the device can access the notification).

What is claimed is:

1. A print service system, comprising:
a print job distribution module to provide a print job associated with a device to a printer;
a location module to determine, following the print job being provided to the printer, whether location information of the device and location information associated with the printer to which the print job was provided satisfy a proximity rule;
a notification module to provide a notification to the device in response to the location information of the device and the location information associated with the printer satisfying the proximity rule, wherein the notification includes at least one of information to release the print job and a mechanism to release the print job;
a role module to determine whether a user associated with the device has an administrator role in response to the location information of the device and the location information associated with the printer satisfying the proximity rule;
a status module to include, in the notification, status information associated with a level of a consumable in the printer in response to a determination that the user has an administrator role; and
a processor to implement the print job distribution module, the location module, the notification module, the role module, and the status module.

2. The print service system of claim 1, wherein the print job distribution module is to provide a release instruction to the printer in response to a print request received from the device after the notification is provided to the device.

3. The print service system of claim 1, wherein the print job distribution module generates the print job in response to receipt of a print request; and wherein the printer service system further comprises:
a scheduler module to determine whether the print job satisfies a predetermined time condition, wherein the notification module is to provide the notification to the device in response to one or both of (i) the location information associated with the device and the location information associated with the printer satisfying the proximity rule and (ii) the print job satisfying the predetermined time condition.

4. The print service system of claim 1, further comprising:
a printer location registry including location information associated with each printer from a plurality of printers, the printer location registry including the location information associated with the printer.

5. The print service system of claim 1, wherein the mechanism to release the print job includes a release code associated with the print job.

6. The print service system of claim 1, wherein the notification includes status information associated with the print job.

7. The print service system of claim 1, further comprising:
a status module to receive status information associated with the printer, the notification including the status information.

8. A non-transitory processor-readable medium storing code representing instructions that when executed at a processor cause the processor to:
provide a print job associated with a device to a printer;
receive location information from the device following the print job being provided to the printer;
receive status information associated with the printer, wherein the status information is associated with a level of a consumable in the printer;
determine whether the location information received from the device and location information associated with the printer satisfy a proximity rule, wherein the proximity rule defines a minimum distance condition between the device and the printer;
determine whether a user associated with the device has an administrator role in response to the location information of the device and the location information associated with the printer satisfying the proximity rule;
provide a notification that includes at least one of information to release the print job and a mechanism to release the print job to the device in response to the proximity rule being satisfied; and
provide, in the notification, the status information in response to a determination that the user has an administrator role.

9. The non-transitory processor-readable medium of claim 8, wherein the status information includes quantity information related to the consumable of the printer.

10. The non-transitory processor-readable medium of claim 8, wherein the status information includes an operational condition of the printer.

11. The non-transitory processor-readable medium of claim 8, further comprising code representing instructions that when executed at a processor cause the processor to:
receive a configuration parameter from the device; and
apply the configuration parameter to the printer.

12. The non-transitory processor-readable medium of claim 8, wherein the location information associated with the device is first location information associated with the device, the processor-readable medium further comprising code representing instructions that when executed at a processor cause the processor to:
receive second location information from the device;
receive a configuration parameter from the device; and
apply the configuration parameter to the printer in response to the second location information received from the device and the location information associated with the printer satisfying the proximity rule.

13. The non-transitory processor-readable medium of claim 8, wherein the notification is a first notification, the processor-readable medium further comprising code representing instructions that when executed at a processor cause the processor to:
provide the print job to the printer in response to receipt of a print request from the device; and
provide a second notification to the device in response to the location information being received from the device and the location information associated with the printer satisfying the proximity rule, the notification including the status information and the second notification including a release code associated with the print job.

14. The non-transitory processor-readable medium of claim 8, wherein the notification is a first notification, the processor-readable medium further comprising code representing instructions that when executed at a processor cause the processor to:
provide the print job to the printer in response to a first print request from the device;
provide a second notification to the device in response to the location information being received from the device and the location information associated with the printer satisfying the proximity rule, the notification including the status information, the second notification including a release code associated with the print job; and
provide a release instruction to the printer in response to a second print request received from the device in response to the second notification.

* * * * *